United States Patent Office 2,816,885
Patented Dec. 17, 1957

2,816,885

CHROME-CONTAINING MONOAZO DYESTUFFS

Gerhard Dittmar, Leverkusen, and Rolf Pütter, Dusseldorf, Germany, assignors to Farbenfabriken Bayer Aktiengesellschaft, Leverkusen, Germany, a corporation of Germany No Drawing. Application January 5, 1955,
Serial No. 480,065

Claims priority, application Germany January 16, 1954

3 Claims. (Cl. 260—151)

The present invention relates to chrome-containing monoazo dyestuffs and to a process of making the same; more particularly it relates to chrome complex compounds of monoazo dyestuffs corresponding to the general formula

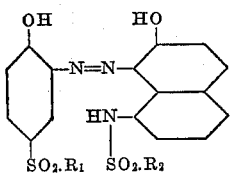

In this formula $R_1$ stands for a low molecular alkyl radical of at least two carbon atoms and $R_2$ for a low molecular alkyl radical, preferably methyl, ethyl or propyl.

Our new dyestuffs can be obtained by coupling the diazo compound of an amine of the formula

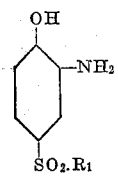

with 1-alkylsulfonylamino-7-hydroxy-naphthalenes of the formula

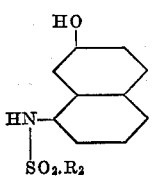

$R_1$ and $R_2$ having the same meaning as above—and by converting the monoazo dyestuffs thus obtained into their chromium complex compounds. Preferably those chroming processes are used as yield chromium complex compounds containing one atom of chromium per two molecules of dyestuff.

The 1-alkylsulfonylamino-7-hydroxy-naphthalenes used as coupling components can be prepared from 1-amino-7-hydroxynaphthalene and alkylsulfonic halides, such as methane sulfonic chloride, ethane sulfonic chloride, n-propane sulfonic chloride in aqueous medium or in organic solvents, e. g. in pyridine.

The new chrome-containing dyestuffs dye wool and other materials of animal origin as silk and leather as well as polyamide and polyurethane fibres from neutral to weakly acid bath in equal and fast bluish grey shades.

Chrome-containing dyestuffs of similar constitution are known from German Patent 909,758. They are obtained by chroming monoazo dyestuffs of the formula

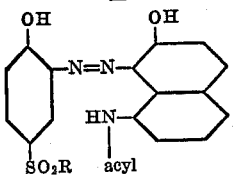

wherein R stands for a low molecular alkyl radical of at least two carbon atoms and acyl for a low molecular fatty acid radical. These chromium complex compounds show in general a low water-solubility so that it is indispensable to mix them intimately with dispersing or wetting agents and with alkaline salts such as alkali metal pyrophosphates or metaphosphates in order to attain a water-solubility sufficient for textile dyeing. Compared therewith the new chrome-containing monoazo dyestuffs show a very good water-solubility also without the use of such auxiliary agents; they further excel these known chrome dyestuffs in the fastness to acids and in the fastness to acid milling.

The present invention is illustrated by the following examples without, however, being limited thereto, the parts being by weight.

Example 1

20.1 parts of 1-amino-2-hydroxybenzene-5-ethylsulfone are diazotized in 100 parts of water and 25 parts of hydrochloric acid (d.=1.15) with 6.9 parts of sodium nitrite dissolved in 20 parts of water. The diazo compound thus obtained is allowed to run into a solution of 23.7 parts of 1-methylsulfonylamino-7-hydroxynaphthalene in 100 parts of water, 8 parts of sodium hydroxide and 40 parts of a 20 percent aqueous ammoni solution at a temperature of 0–5° C. The coupling can be accelerated by adding 30 parts of pyridine. After a few hours the dyestuff formation is finished. 20 parts of common salt are added, and the precipitated dyestuff is isolated. The filter cake thus obtained is dissolved at the boil in 1000 parts of water and 5 parts of sodium hydroxide. To this solution are dropped in the course of 15 minutes 200 parts of a solution containing 8 parts of potassium bichromate and 18 parts of glucose. The solution is kept at the boil for 30 minutes and then cooled to 75° C. upon which the dyestuff-chrome complex is separated by adding 30 parts of common salt and filtered.

After drying the chrome complex thus obtained represents a grey-black powder which dissolves in water with a bluish-grey color. It is the chrome complex of the monoazo dyestuff of the formula

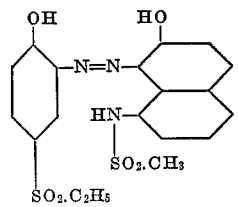

and dyes wool uniformly from a neutral to weakly acid bath in very fast bluish-grey shades.

Example 2

20.1 parts of 1-amino-2-hydroxybenzene-5-ethylsulfone are diazotized in 100 parts of water and 25 parts of hydrochloric acid (d.=1.15) with 6.9 parts of sodium nitrite dissolved in 20 parts of water. The diazo compound thus obtained is allowed to run into a solution of 26.5 parts of 1-propylsulfonylamino-7-hydroxy-naphthalene in 100 parts of water, 8 parts of sodium hydroxide and 40 parts of a 20 percent aqueous ammonia solution at a temperature of 0–5° C. The coupling can be accelerated by adding 30 parts of pyridine. After a few hours the dyestuff formation is finished. 20 parts of common salt are added and the precipitated dyestuff is isolated. The filter cake thus obtained is dissolved at the boil in 1000 parts of water and 5 parts of sodium hydroxide. To this solution are dropped in the course of 15 minutes 200 parts of a solution containing 8 parts of potassium bichromate and 18 parts of glucose. The solution is kept at the boil for 30 minutes and then cooled to 75° C. upon which the dyestuff-chrome complex is separated by adding 30 parts of common salt and filtered.

After drying the chrome complex thus obtained represents a grey-black powder which dissolves in water with a bluish-grey color. It is the chrome complex of the monoazo dyestuff corresponding to the formula

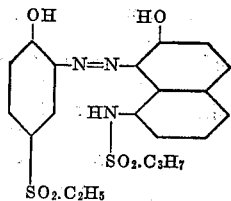

and dyes wool uniformly from a neutral to weakly acid bath in very fast bluish-grey shades.

*Example 3*

21.5 parts of 1 - amino - 2 - hydroxybenzene - 5 - n-propylsulfone are diazotized in 100 parts of water and 25 parts of hydrochloric acid (d.=1.15) with 6.9 parts of sodium nitrite dissolved in 20 parts of water. The diazo compound thus obtained is allowed to run into a solution of 23.7 parts of 1 - methylsulfonylamino - 7-hydroxynaphthalene in 100 parts of water, 8 parts of sodium hydroxide and 40 parts of a 20 percent aqueous ammonia solution at a temperature of 0–5° C. The coupling can be accelerated by adding 30 parts of pyridine. After a few hours the dyestuff formation is finished. 20 parts of common salt are added and the precipitated dyestuff is isolated. The filter cake thus obtained is dissolved at the boil in 1000 parts of water and 5 parts of sodium hydroxide. To this solution are dropped in the course of 15 minutes 200 parts of a solution containing 8 parts of potassium bichromate and 18 parts of glucose. The solution is kept at the boil for 30 minutes and then cooled to 75° C. upon which the dyestuff-chrome complex is separated by adding 30 parts of common salt and filtered.

After drying the chrome complex thus obtained represents a grey-black powder which dissolves in water with a bluish-grey color. It is the chrome complex of the monoazo dyestuff corresponding to the formula

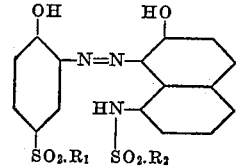

and dyes wool uniformly from a neutral to weakly acid bath in very fast bluish-grey shades.

We claim:

1. Chromium complex compounds of monoazo dyestuffs corresponding to the following formula

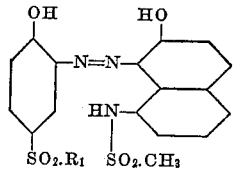

wherein $R_1$ stands for a low molecular alkyl radical containing at least two carbon atoms, and $R_2$ stands for a low molecular alkyl radical.

2. Chromium complex compounds of monoazo dyestuffs corresponding to the following formula

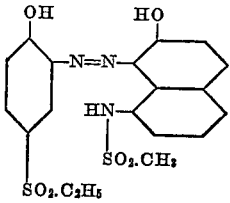

wherein $R_1$ stands for a low molecular alkyl radical containing at least two carbon atoms.

3. The chromium complex compound of the monoazo dyestuff corresponding to the formula

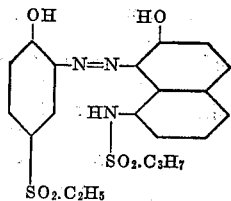

References Cited in the file of this patent

UNITED STATES PATENTS

| | | |
|---|---|---|
| 2,254,602 | Fleischhauer et al. | Sept. 2, 1941 |
| 2,551,056 | Schetty | May 1, 1951 |
| 2,711,404 | Schetty | June 21, 1955 |